April 26, 1966 M. R. BOYD 3,248,594

MULTIPLE-BEAM RADIO FREQUENCY APPARATUS

Filed May 9, 1962 2 Sheets-Sheet 1

Inventor:
Malcolm R. Boyd,
by Philip L. Schlamp
His Attorney.

April 26, 1966 M. R. BOYD 3,248,594

MULTIPLE-BEAM RADIO FREQUENCY APPARATUS

Filed May 9, 1962 2 Sheets-Sheet 2

Inventor:
Malcolm R. Boyd,
by Philip D. Schlamp
His Attorney.

United States Patent Office 3,248,594
Patented Apr. 26, 1966

3,248,594
MULTIPLE-BEAM RADIO FREQUENCY APPARATUS

Malcolm R. Boyd, Schenectady, N.Y., assignor to General Electric Company, a corporation of New York Filed May 9, 1962, Ser. No. 193,492
9 Claims. (Cl. 315—5.14)

This invention relates to multiple-beam radio frequency (R.F.) apparatus adapted for generating and handling relatively high electromagnetic wave power at relatively highly frequencies and more particularly to means for coupling electromagnetic wave energy into and out of such apparatus.

In copending U.S. application S.N. 173,724 of M. R. Boyd et al. Filed February 16, 1962, and assigned to the same assignee as the present invention there is disclosed and claimed multiple-beam apparatus adapted for generating and handling substantially high electromagnetic wave powers at microwave frequencies and in a manner effective for attaining maximum-efficiency energy exchange between the beams and electromagnetic waves in cooperating resonators and for minimizing mode interference problems of the type theretofore encountered in multiple-beam devices. In such apparatus it is desirable to provide input and output coupling means which will afford satisfactory coupling without adversely affecting, or degrading the mentioned energy exchange efficiency and which will not introduce mode separation problems. More specifically, tighter coupling to a multiple-beam device including a resonator which can be resonated in a plurality of modes is required. For example, I have found that for the same loaded Q, an N-section resonator must be coupled N times as tightly as a single-mode resonator. Inductive loop coupling can be employed; however, in some applications the loop required would have to be large and a self-reactance of such a loop could become excessive. Also, in order not to degrade the operating advantages of apparatus of the Boyd et al. type it is desirable that the coupling be effected without disturbing the fields in the interaction, or beam-traversing, regions of the resonators. Further, it is desirable that the coupling be effected in a manner which minimizes coupling to modes adjacent in frequency to the desired mode.

The present invention contemplates the provision of a probe coupling arrangement adapted for coupling electromagnetic wave energy into and out of a periodically-loaded resonant section of transmission line and effective in providing multiple-beam radio frequency apparatus adapted for accomplishing all of the above-discussed desiderata.

Accordingly, a primary object of the present invention is to provide a new and improved radio frequency coupling arrangement.

Another object of this invention is to provide new and improved means for coupling electromagnetic wave energy into and out of a multiple-beam device including a resonant section of periodically loaded transmission line.

Another object of this invention is to provide new and improved multiple-beam radio frequency apparatus including one or more new and improved probe coupling arrangements adapted for providing satisfactory tight coupling to electromagnetic wave energy within said resonator without disturbing the electric field patterns therein and with minimal coupling to freqeuncy modes other than a desired mode.

Further objects and advantages of this invention will become apparent as the following description proceeds and the features of novelty which characterize this invention will be pointed out with particularity in the claims annexed to and forming part of this specification.

In carrying out the objects of this invention, and according to one embodiment thereof, there is provided multiple-beam radio frequency apparatus comprising input, output, and preferably at least one intermediate, longitudinally-resonant waveguides supported in spaced parallel relation. Extending perpendicular to and in cooperative association with the waveguides are a plurality of parallel klystron-like beam devices. Each such device includes a plurality of axially-spaced drift tubes defining input, output and one or more intermediate interaction gaps each located in a respective one of the mentioned waveguides and an electron gun for projecting a beam of electrons through the drift tubes across the interaction gaps, and a collector for collecting the electrons emerging from the last drift tube. The input and output waveguides each contain an array of equally-spaced impedance means effecting periodic loading thereof. The interaction gaps constitute active impedance elements in the mentioned array and positioned midway between each adjacent pair of active impedance elements is a passive impedance element having a capacitive reactance of substantially the same capacitance value as an interaction gap. Together with at least one periodic location in the mentioned array and located between an adjacent pair of passive impedance elements is a coupling means including a metal probe element extending reentrantly in the waveguide and characterized by a capacitive reactance having substantially the same value as those of the other impedance elements. The coupling means can advantageously comprise a coaxial line terminated by the probe and having a quarter-wave impedance matching sleeve in the coaxial outer conductor. Further, the periodic electrical spacing between the impedance elements and between the outermost ones thereof and the end walls of the waveguide is made equal to one quarter of the loaded guide wavelength at a predetermined operating frequency. The intermediate waveguide can be identical to the input and output waveguides except for the absence of the probe couplers, unless for some applications it is desirable to couple radio frequency energy into or out of such guides or unless it is desired to couple such guides together which can be accomplished utilizing the probe coupling arrangement of the present invention. By means of the input probe coupler a standing electromagnetic wave of the aforesaid frequency can be established in the input waveguide which will result in the occurrence therein of an operating mode characterized by electric field maxima at the active impedance elements and the probe element and voltage nodes, or electric field minima, at the passive impedance elements thereby to provide $\pi/2$ mode operation. In accordance with the invention of the above-mentioned Boyd et al. application, this excitation of the input waveguide results ultimately in the induction of a corresponding amplified electromagnetic wave in the output waveguide. In the output waveguide also electric field maxima occur at the active impedance elements and the probe and the minima occur at the passive impedance elements. Thusly, the present invention provides for the desired manner of coupling without degrading the capabilities of the apparatus for operating according to the teaching of Boyd et al.

For a better understanding of the invention reference may be had to the accompanying drawing in which.

Figure 1:
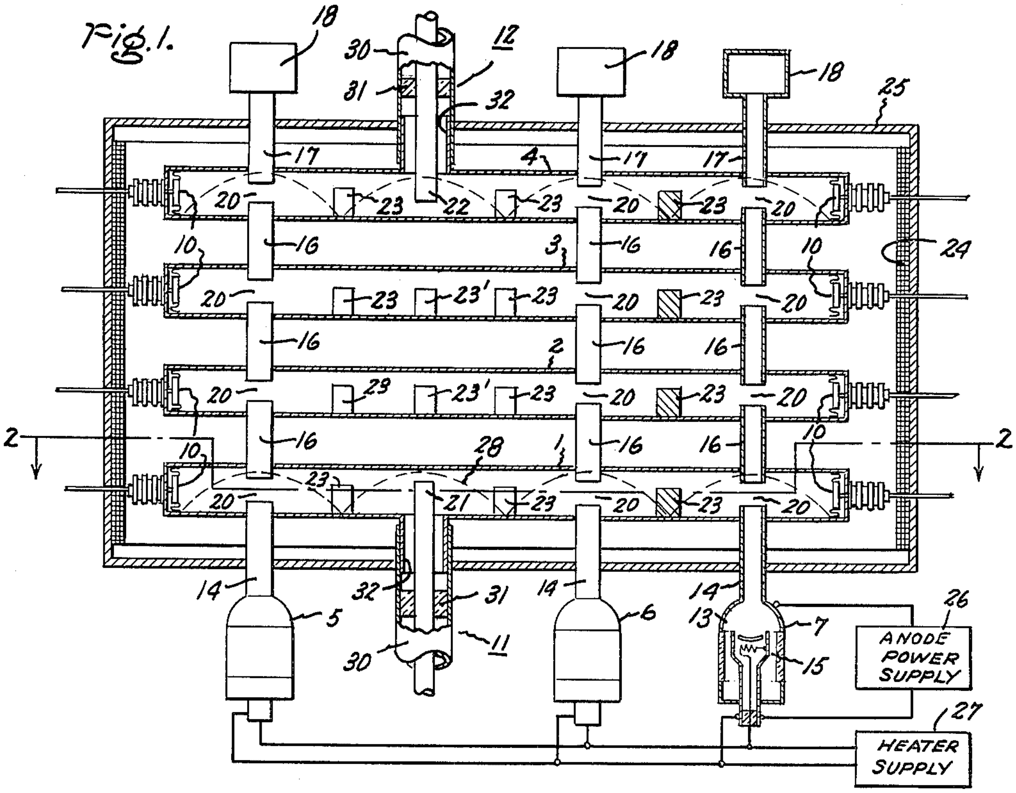
FIGURE 1 is a sectional view of a multiple-beam electric discharge device constructed according to one embodiment of the invention.
Figure 5:
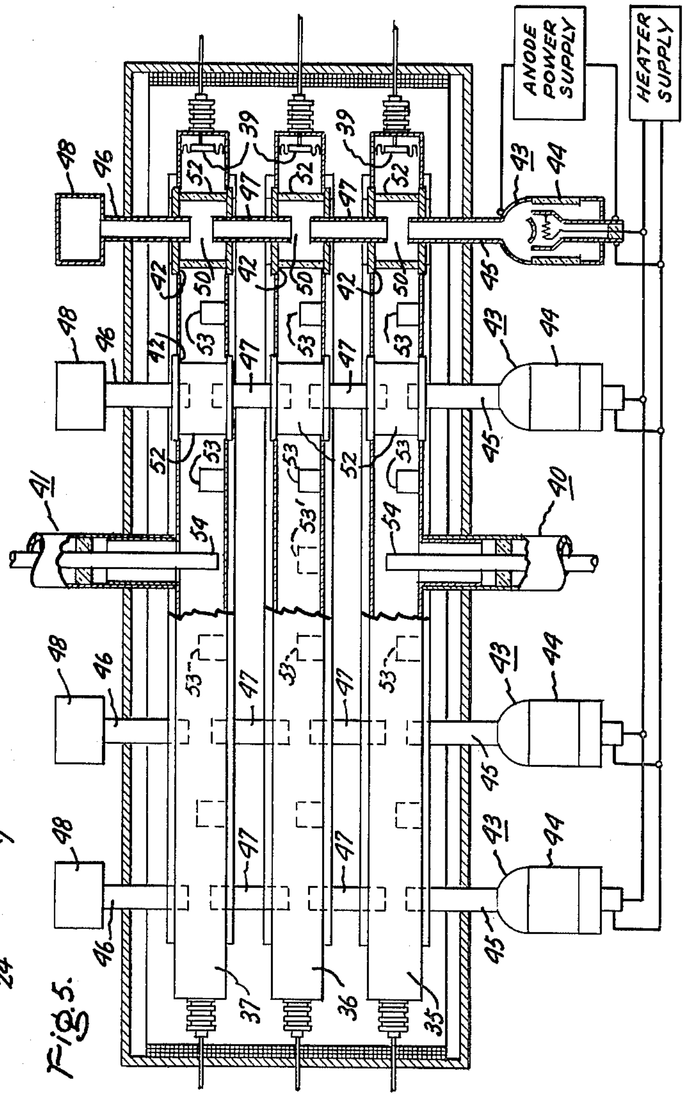
FIGURE 5 is a partially sectionalized view of still another embodiment of the invention.

Referring now to FIGURE 1, there is shown multiple-beam radio frequency amplifying apparatus constructed in accordance with the invention. More specifically, the arrangement of FIGURE 1 is an electric discharge device in which D.C. energy from three electron beams is converted into electromagnetic wave energy having substantially three times the power generating and handling capacities of one single-beam klystron of comparable dimensions and which is adapted for having radio frequency energy coupled into and out of sections thereof, respectively, without adversely affecting the mentioned power generating and handling capabilities. However, from the outset, it is to be understood that the radio frequency coupling arrangement of the present invention can be used with mutliple-beam devices having more or less than three electron beams and, in fact, is shown in FIGURE 5 in a four-beam device and is contemplated for effective use in a device having up to at least twenty beams.

The device of FIGURE 1 is constructed as a unitary evacuated envelope comprising four longitudinally-resonant waveguides designated 1–4 arranged in spaced parallel relation and a plurality of transversely extending cooperating klystron-like beam devices designated 5–7. In this arrangement, and according to the invention of the above-referenced Boyd et al. application, each of the waveguides 1–4 is a short-circuited or longitudinally-resonant section of a periodically-loaded waveguide. The waveguides are preferably rectangular in cross-section as shown; however, it is to be understood and will be appreciated from the following disclosure, that the invention is not limited to use of waveguides of this particular cross-sectional configuration. Additionally, the periodic loading, which will be described in detail hereinafter is provided by interaction gaps of the beam devices, passive capacity gaps and coupling probe elements all of which are predeterminedly and periodically arranged in the waveguides.

Figure 2:
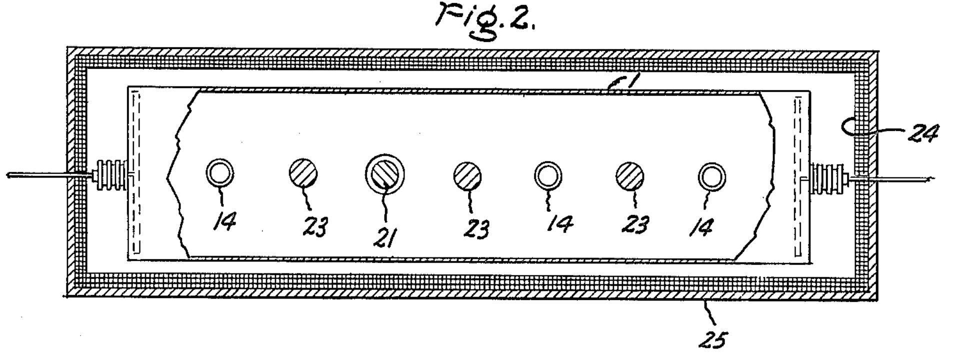
FIGURE 2 is a stepped cross-sectional view taken along the lines 2—2 of FIGURE 1 and looking in the direction of the arrows.

The lowermost waveguide 1 in FIGURE 1 constitutes an input resonator and is adapted to be excited for having a standing electro-magnetic wave established therein. In a manner generally similar to that well known in the klystron art, and input resonator is effective when resonated for velocity modulating the beams of the devices 5–7. The uppermost waveguide 4 in FIGURE 1 constitutes an output resonator and is adapted for having an amplified electromagnetic wave induced therein. Interposed between the input and output resonators 1 and 4 are intermediate resonators 2 and 3 which are shown as two in number but which can be employed in any desired number, which intermediate resonators serve to increase beam modulation and bunching efficiency in generally the same well-known manner as intermediate resonators found in the klystron art. The frequency characteristics of each of the resonators 1–4 can be selectively variable by means of adjustable tuning members 10 which, as seen in FIGURES 1 and 2, can be provided at the ends of each waveguide 1–4. Associated with the input and output waveguides 1 and 4 are probe coupling arrangements generally designated 11 and 12, respectively. As indicated above, the input and output probe couplers cooperate in the periodic loading of the input and output waveguide sections; and, in order to bring out clearly the structure and function of the present invention and the manner in which it is effective for coupling energy into and out of a multiple-beam device without adversely affecting the operation thereof, the overall device will now be described in detail.

The beam devices 5–7 each comprise a gun section 13 including a tubular section 14 sealed and extending reentrantly in one side of the input resonator 1 and an emitter generally designated 15 adapted for directing a beam of electrons axially through the section 14. Axially aligned with each section 14 are a plurality of drift tubes 16, and axially aligned therewith and extending from the output resonator 4 is a tubular section 17 connected to a collector 18. In the described arrangement the tubular sections 14 and 17 and drift tubes 16 extend reentrantly in the several resonators to define therein reentrant active capacitive gaps, or elements, designated 20 which have uniform capacitance values across each waveguide. As seen in FIGURE 1, and in accordance with the mentioned Boyd et al. invention, the active gaps 20 are located in the waveguides according to a predetermined periodic arrangement. In the specific periodic arrangement of FIGURE 1, and according to the present invention, the probe couplers 11 and 12 are included in the periodic arrangement. More specifically, the input coupler 11 includes a reentrant probe element 21 disposed midway between an adjacent pair of active gaps in the input waveguide. In the output waveguide 4 a probe element 22 of the output coupler 12 is similarly arranged midway between a pair of adjacent active gaps. Also, there is provided midway between each pair of adjacent active gaps and between an adjacent active gap and probe element in each resonator a dummy element 23. The probe elements 21 and 22 and dummy elements 23 constitute passive capacitive elements and each has a capacitance value substantially the same as the capacitance value of one of the active gaps; and the outermost gaps 20 are spaced from the end walls of the resonators an amount equal to the spacing between the active and passive impedance elements. Thus, the input and output waveguides are periodically loaded with capacitances of equal values. In the input and output waveguides this periodic loading comprises alternate active and passive capacitances except for the section wherein the probe elements are located midway between adjacent passive capacitances. In the input and output waveguides the probe elements displace the active gaps and in the intermediate waveguides dummy elements 23′ are provided in these regions to insure the proper electromagnetic field configurations in resonators 2 and 3.

The described device is surrounded by a solenoid coil 24 which provides a collimating magnetic field extending parallel to the axes of the beam devices and adapted for focusing several electron beams therein. The entire assembly is enclosed by a casing 25 formed, for example, of a material effective to provide uniformity of the axial magnetic field in the region through which the electron beams pass. The electron guns 15 can be supplied with operating potentials from any suitable sources indicated by 26 and 27 and which are well known to those skilled in the art.

Figure 3:
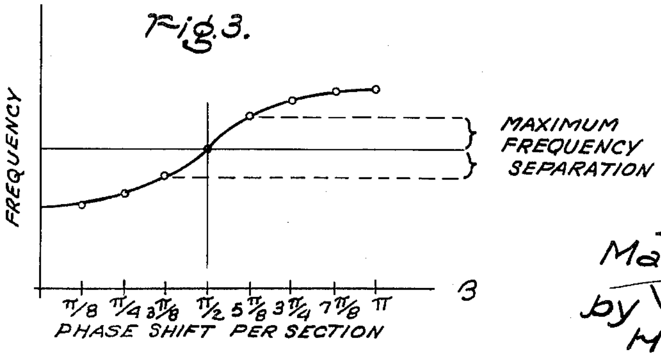
FIGURE 3 is an $\omega$-$\beta$ diagram showing the graphical relation between the frequency of operation of a periodically-loaded waveguide and the phase shift per section of such a waveguide.

In the operation of the above-described device a standing electromagnetic wave is established in each waveguide resonator. Also, in each resonator and at a predetermined operating center frequency the electric field maxima occur at each of the active gaps 20 and at the probe elements 21 and 22 and electric field minima, or nodes, occur at each of the passive gaps except 23′ and at each of the waveguide end walls. This is illustrated by the dash lines 28 in FIGURE 1; and, as seen in FIGURE 3, results in a maximum frequency separation between the desired $\pi/2$ mode and adjacent undesired modes. Multiple-beam devices prior to the mentioned Boyd et al. invention had not employed this arrangement of periodic capacitances and, thus, were not adapted for satisfactory mode separation.

The present invention provides for coupling radio frequency energy into the input waveguide 1 and out of the output waveguide 4 of the described device without degrading the above-discussed desirable operating capabilities of multiple-beam devices and without effecting undesired coupling to modes adjacent the desired operating mode. Specifically, and as mentioned above and shown by the dash line 28 when the waveguides are resonated in the $\pi/2$ mode the coupling probes 21 and 22 are located at points of electric field maxima thus to enable maximum induction of fields in the probe elements. Additionally, at these locations the probe elements 21 and 22 appear to the standing waves in the resonators merely as ones of the periodic impedance elements loading the waveguides. Thus, tight coupling is effected without disturbing the electric field patterns in the device and without coupling to modes adjacent the $\pi/2$ operating mode. Expressed in another manner, the device is adapted for the same operation as obtainable with the Boyd et al. device without that operation being adversely affected by the probe couplers and with the provision of means for enabling tight coupling of radio frequency energy into and out of the device.

To this point the couplers 11 and 12 have been described only as including reentrant probe elements 21 and 22. As shown in FIGURE 1, the couplers 11 and 12 can comprise coaxial transmission lines each including an outer conductor 30, an insulative support member and vacuum seal 31 and a quarter wave length impedance matching transformer or sleeve 32. The transformers 32 are provided to match the impedance of the coaxial line to the impedance desired in the resonators. The impedance of the transformers 32 can be given by the equation $$Z_T=\sqrt{Z_R Z_L}$$

where $Z_T$=the impedance of the transformer 17, $Z_R$ the impedance of the resonator, and $Z_L$=the characteristic impedance of the transmission line.

While in FIGURE 1 the probe elements 21 and 22 are shown as located at inner sections of the waveguides it is to be understood that, if desired, they can be located anywhere along the periodically-loaded transmission lines constituted by the waveguides. Each coupling arrangement of the present invention consists essentially of one periodic length of a multi-mode resonator and can be located anywhere along the waveguides at an electric field maxiumum location. At such a location the length of the coupler probe is adjusted so that the section resonates at the desired operating frequency when the line is shortened at the ends. The amount of coupling or loaded Q of the cavity is determined by the dimensions of the quarter-wave matching sleeve 32.

Figure 4:
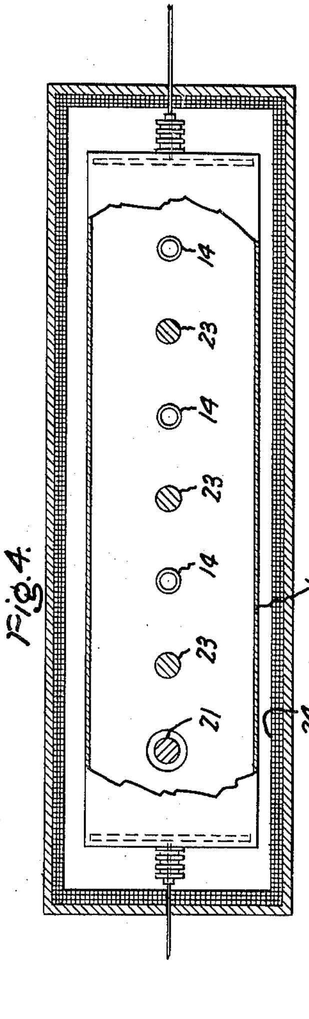
FIGURE 4 is a fragmentary sectional view of another embodiment of the invention.

Illustrated in FIGURE 4 is a modified form of the invention which can be identical to the structure of FIGURES 1 and 2 except that the probe coupler is located at an end section of the waveguide instead of an intermediate section. However, in FIGURE 4, also, the probe element is located at a field maximum region and thus the structure of FIGURE 4 is adapted for the same operational advantages as that of FIGURES 1 and 2.

As seen in FIGURE 5, a device constructed according to the present invention need not comprise a unitary evacuated envelope including both the waveguide sections and beam devices. Instead, and as illustrated in this figure, the waveguide sections, incorporating the passive capacitances provided by the coupled problems and the dummy elements, and beam devices can comprise discrete subassemblies with the beam devices detachably mounted in, or coupled to, the waveguide sections.

Specifically, the apparatus can comprise a plurality of discrete resonant waveguide sections 35 and 37, having end wall tuning means 39 similar in structure and function to those described above in respect to FIGURE 1. The waveguides 35 and 37 can comprise input and output resonators, respectively, and include input and output couplers generally designated 40 and 41, respectively, which can be identical in all respects to the couplers in FIGURE 1.

Additionally, the resonator 36 can comprise an intermediate resonator having the same function as any intermediate resonator in FIGURE 1. If desired, more than one intermediate resonator can be provided.

The resonators 35–37 are provided with suitable sockets generally designated 42 adapted for receiving therein the interaction assemblies of a plurality of discrete external resonant section klystrons 43. The klystrons 43 can each comprise an evacuated device including a gun section 44, tubular sections 45 and 46 and intermediately located drift tubes 47 and a collector 48. Additionally the opposed ends of the sections 45 and 46 and the drift tubes 47 cooperate to provide interaction, or active capacitive, gaps 50. These sections are also provided with flanges between which are suitably sealed cylindrical ceramic radio frequency windows 52.

Provided in each of the waveguides 35 and 37 and located midway between each adjacent pair of interaction gaps 50 is a passive, or dummy, capacitive gap or element 53. Also provided in each of the waveguides 35 and 37 and located midway between an adjacent pair of dummy elements 53 is radio frequency coupler probe element 54 which is of substantially the same capacitance value as each of the active gaps 50 and passive gaps 53. Further, the spacing of the waveguide terminations, or short circuits, relative to the outermost capacitive gaps is essentially the same as the spacing between adjacent interaction and dummy gaps. Thus, the interaction gaps 50, the dummy capacitive gaps 53 and the probe elements provide essentially the same periodically-loaded waveguide structure as that described with reference to FIGURES 1–4. Also, the overall assembly can be provided with an identical solenoid structure; and the purpose, function and operational benefits of the apparatus of FIGURE 5 can be identical to those of the device of FIGURES 1–4.

While the invention is thus shown and the mode of operation of specific embodiments have been described, the invention is not limited to these shown embodiments. Instead, the foregoing will suggest to those skilled in the art modifications which will lie within the scope of the invention. For example, the invention is not limited to use of coaxial transmission lined couplers, but can be used in a device incorporating almost any desired type of line in combination with a probe element. Specifically, and if desired, the reentrant probe elements can be employed for providing coupling between the periodically-loaded waveguides and another waveguide, such as a waveguide output, merely by coupling the other waveguide to the periodically-loaded waveguide through an aperture and suitably supporting in the aperture a probe element extending reentrantly in the periodically-loaded wave guide at a point of electric field maximum.

Further, the present invention is not limited to apparatus wherein the active capacitive gaps comprise the interaction gaps of beam-type devices. The present concept of coupling radio frequency energy into or out of a waveguide resonator periodically-loaded with active and capacitive gaps is applicable also to appartus wherein other types of active gaps are employed, such, for example, as the apparatus disclosed and claimed in copending U.S. application S. N. 173,703 of R. A. Dehn filed February 16, 1962 and assigned to the same assignee as the present invention and wherein space charge control devices are employed.

What is claimed as new and desired to secure by Letters Patent of the United States is:

1. Radio frequency apparatus comprising a longitudinally-resonant section of transmission line, said line being periodically loaded by a linear array of active impedance elements and passive impedance elements of comparable capacitance values, the active elements constituting interaction gaps, means for operating said line in a mode characterized by electric field maxima occuring at said each active elements and minima at each said passive elements for effecting maximum-efficiency energy exchange between said electrons and said wave and maximum mode separation, and coupling means including a probe element located in said line in a maximum electric field region intermediate a pair of adjacent passive elements and having a capacitance value comparable to those of said active and passive elements.

2. Radio frequency apparatus according to claim 1, wherein said transmission line comprises a waveguide and said coupling means comprises a coaxial transmission line mounted on said waveguide and including an inner conductor extending reentrantly in said waveguide a predetermined distance.

3. Radio frequency apparatus according to claim 1, wherein said transmission line comprises a waveguide and said coupling means comprises a coaxial transmission line having an outer conductor mounted on said waveguide, an inner conductor extending reentrantly in said waveguide and a quarter wavelength impedance-matching transformer mounted in said outer conductor.

4. Radio frequency apparatus comprising at least a pair of longitudinally resonant sections of transmission line, each adapted for being resonated in a mode having alternate electric field maxima and minima occurring periodically in said lines, each said line being periodically loaded by a linear array of active and passive impedance elements and a probe element of a radio frequency coupler, the active elements of each section constituting interaction gaps, being aligned with respective elements of the other section and being located at maximum electric field regions in said line, said probe elements each being located also at a maximum field region in its respective line intermediate and adjacent pair of passive elements, the passive elements constituting passive capacity gaps and being located at minimum field regions in said lines, said active and passive elements and said probe element all having substantially the same capacitance values, and means directing electrons successively across the respective interaction gaps of first said one and then the other section.

5. A multiple-beam electric discharge device comprising an evacuated envelope including as sections thereof at least an input resonant waveguide, an output resonant waveguide, and an intermediate resonant waveguide all of which are arranged in parallel relation, said waveguides being adapted for being resonated in a mode characterized by alternate electric field maxima and minima occurring periodically in said waveguides, each said waveguide being periodically loaded by a straight linear array of several equally-spaced reentrant impedance elements having substantially the same capacitive values, said reentrant elements for each input and output waveguide comprising a plurality of active interaction gaps and the probe element of a radio frequency coupler each of which is located at maximum electric field regions in said waveguide, said radio frequency couplers being positioned in their respective input and output waveguides in coaxial and opposed relationship, and a plurality of passive capacitive gaps located at minimum electric field regions in said waveguide, said active gaps of each waveguide being axially aligned with respective gaps in the other waveguide, drift tubes interconnecting said interaction gaps in said intermediate waveguide and means for projecting at least several discrete electron beams transversely successively across said input and output waveguides at said interaction gaps.

6. A multiple-beam electric discharge device according to claim 5, wherein said probe elements are located at intermediate regions in said linear arrays of reentrant impedance elements.

7. A multiple-beam electric discharge device according to claim 5, wherein said radio frequency couplers each include in addition to said probe element and outer coaxial conductor mounted on its respective waveguide and a quarter wavelength impedance-matching conductive sleeve mounted in said outer conductor.

8. A multiple-beam radio frequency apparatus comprising an input, an output, and at least one intermediate longitudinally-resonant waveguide all arranged in parallel relation, said waveguides being adapted for being resonated in a mode characterized by at least four alternate electric field maxima and minima occurring periodically in said waveguides in equidistant straight line relationship, said waveguides each having mounted therein at least three beam devices adapted for projecting discrete electron beams transversely successively across said waveguides at each of at least three of said electric field maxima, at least two of which are in adjacent relationship, said beam devices including interaction gaps disposed in said input and output waveguides at maximum electric field regions, drift tubes in said intermediate waveguide interconnecting said interaction gaps, each of said input and output waveguides having a radio frequency coupler including a probe element extending reentrantly therein in coaxial and opposed relationship at a maximum electric field region between said beam devices and a plurality of passive capacitive elements each located therein at a minimum electric field region, and said interaction gaps, probe elements and passive elements all being characterized by substantially the same capacitance value.

9. A multiple-beam radio frequency apparatus according to claim 8, wherein said probe elements are located in said waveguides at maximum electric field regions spaced inwardly from the outermost electric field maxima.

References Cited by the Examiner

UNITED STATES PATENTS

| | | | |
|---|---|---|---|
| 2,353,742 | 7/1944 | McArthur | 315—5.16 |
| 2,434,115 | 1/1948 | McArthur | 315—39 |
| 2,458,556 | 1/1949 | Bowen | 315—5.46 X |
| 2,657,329 | 10/1953 | Wathen | 315—5.29 X |
| 2,886,742 | 5/1959 | Hull | 315—39 |
| 2,900,610 | 8/1959 | Allen et al. | 333—35 |
| 2,910,614 | 10/1959 | Bondley | 313—83 X |
| 2,920,229 | 1/1960 | Clarke | 315—5.16 |

FOREIGN PATENTS

| | | |
|---|---|---|
| 686,830 | 2/1953 | Great Britain. |

ELI LIEBERMAN, *Acting Primary Examiner.*

ARTHUR GAUSS, HERMAN KARL SAALBACH, *Examiners.*

S. CHATMON, *Assistant Examiner.*